United States Patent Office 3,540,285
Patented Nov. 17, 1970

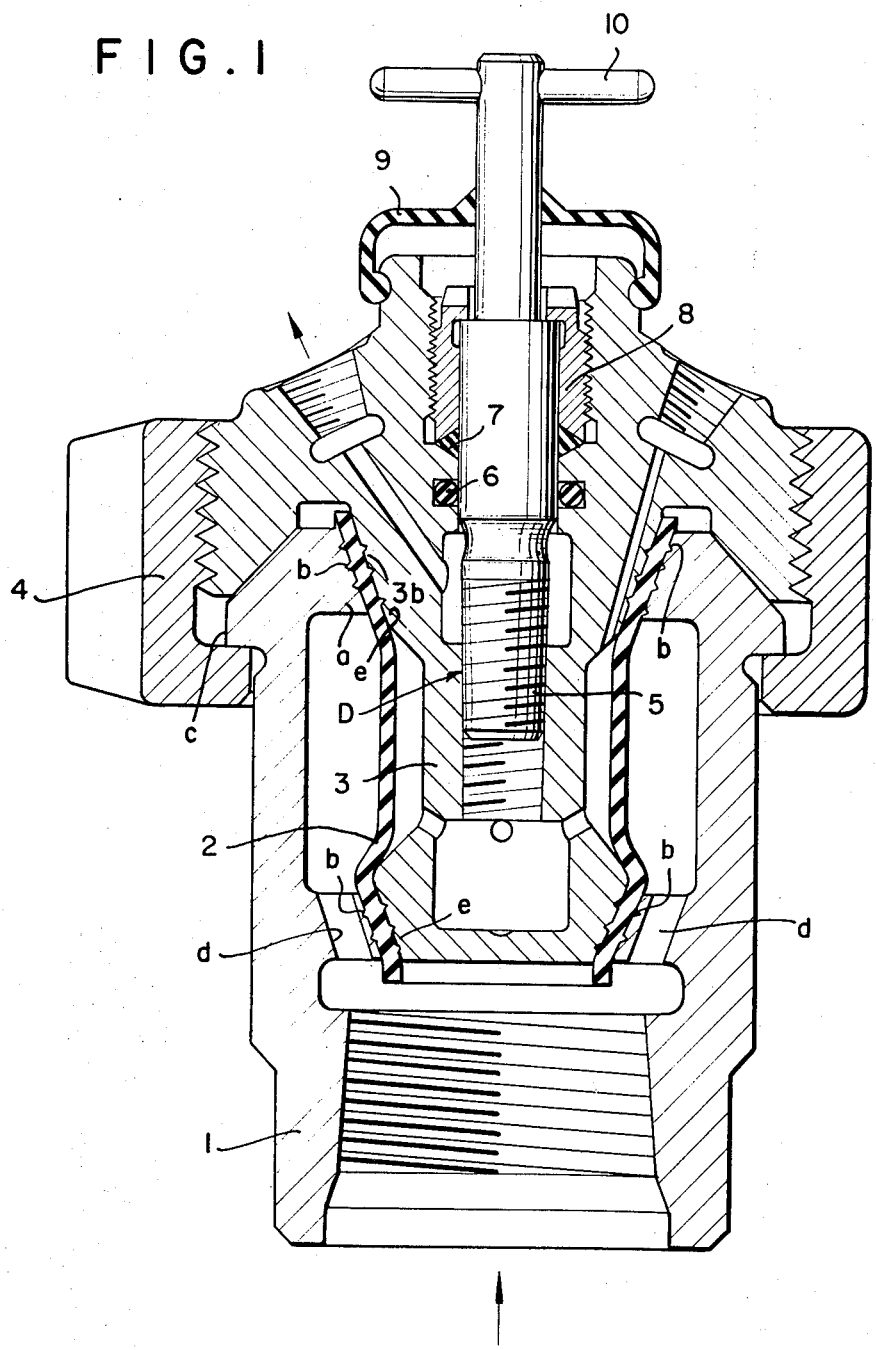
IOAN NICOLAU
VALENTIN EUGEN HANCIULESCU
INVENTOR.

3,540,285
APPARATUS FOR DAMPING PULSATING PRESSURES IN PRESSURE GAUGES
Ioan Nicolau, Cimpina, and Valentin Eugen Hanciulescu, Bucharest, Rumania, assignors to Institutul de Cercetari si Proiectari Pentru Industria Extractiva de Titei si Gaze, Campina, Rumania, a corporation of Rumania
Filed Apr. 30, 1968, Ser. No. 725,359
Claims priority, application Rumania, May 3, 1967, 53,670
Int. Cl. G01i *19/00*
U.S. Cl. 73—392                3 Claims

ABSTRACT OF THE DISCLOSURE

Damping of pulsating pressures to protect pressure gauges used for drilling fluids and cement slurries is achieved by streamlined flow created along a capillary channel of adjustable length, the flow cross-section thereof being variable from inlet to outlet so that the inlet cross-section of said capillary channel remains constant at all times, while the outlet cross-section of said capillary channel decreases continuously and proportionally to the engaged length of the capillary channel. This results in a helical capillary channel along the profile crest of a cylindrical thread, progressively truncated by externally machining a cylindrical thread pin, screwed into a regular cylinder thread member, the thread crests thereof being not truncated. The capillary channel is of variable length, proportional to the number of pin threads being engaged, at the same time the cross-section of the capillary channel has a triangular shape and is variable from inlet to outlet. This damping device is operatively connected with a separator comprising a cylindrical diaphragm, the damping device being concentric with the separator cylinder diaphragm. By mounting the damping device together with the separator and pressure gauge in a common housing there is provided a single unit for measuring drilling fluid and cement slurry pressures.

---

Figure 2A:
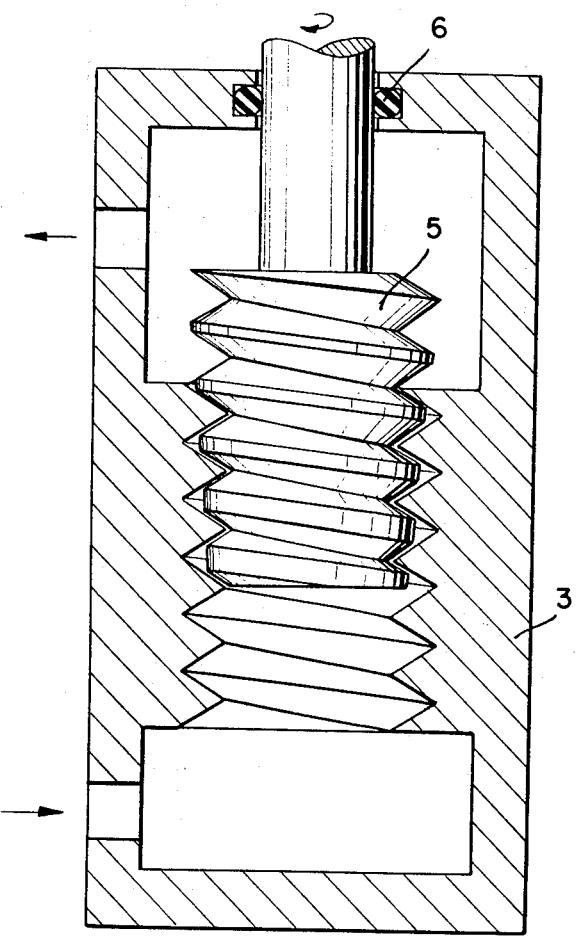

The invention relates to an apparatus for damping pressure pulsation in pressure gauges by restricting velocity of fluid flow by use of a capillary deadener, also comprising a diaphragm fluid separator, designed especially for pressure gauges used in the petroleum industry for drilling fluids and cement slurries.

The existing damping devices eliminate pressure pulsations in that they achieve laminar flow of the fluid by the use of various means, which have, however, some disadvantages. The capillary choke damping devices are not adjustable and no access is provided for cleaning. The pulsation damping devices comprising a long conical needle permit reduction of pressure pulsation only within a very narrow range. The conical-thread damping devices are of complicated construction, as the conical-thread must be precision machined and, like the above conical-needle device, pressure-pulsation reduction is only possible within narrow limits. The cylindrical-thread damping devices, while eliminating most of the drawbacks mentioned above, have the disadvantage that in adjusting them only the length of the capillary channel resulting along the thread root profile of the pin is changed, the flow cross-section remaining constant. For this reason, a thread of great length is required to provide a suitable adjustment range.

For liquids having special characteristics such as: corrosive properties, solid suspensions, thixotropy, etc., the damping devices are used in conjunction with diaphragm fluid separators of various types. This combination of both damping device and fluid separator has the disadvantage of having a complicated diaphragm shape and requiring multiple sealing means.

The pressure damping method set forth in the present invention eliminates the above disadvantages by achieving streamlined flow along an adjustable length of a capillary channel with the cross-section changing from the inlet to the outlet, so that the inlet cross-section of the capillary channel remains constant at all times, while the outlet cross-section of said capillary channel decreases continuously and proportionally to the engaged length of the capillary channel, resulting thus in a helical capillary channel along the thread crest profile. The latter is progressively truncated by externally machining a cylindrical thread pin fitted in a regular cylindrical thread member, whose thread crests are not truncated, the capillary channel thus created being of variable length, proportional to the number of threads of the pin being engaged. The cross-section of the capillary channel thus is triangular in shape and changes from inlet to outlet. The damping device may also be operatively connected with a cylindrical diaphragm fluid separator such that the damping device is positioned concentrically inside the cylindrical diaphragm of the fluid separator.

Figure 2B:
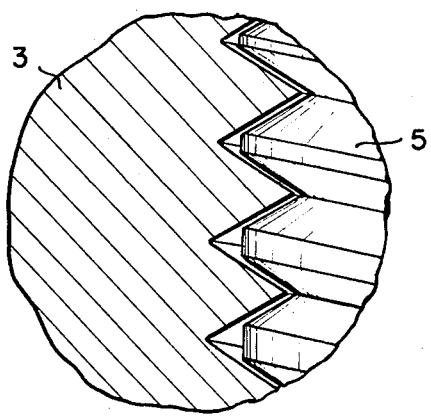
Figure 3A:
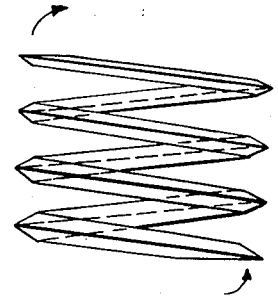
Figure 3B:
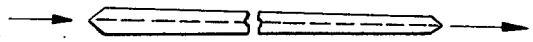
Figure 3C:
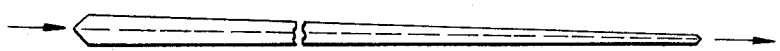

An embodiment of this method is described below, use being made of FIGS. 1, 2 and 3 wherein:

FIG. 1 is a longitudinal section through the damping assembly combined with fluid separator;

FIG. 2*a* is a schematic diagram of the damping device;

FIG. 2*b* is a partial view of the thread forming the streamlined flow channel;

FIG. 3*a* is a helical capillary channel;

FIG. 3*b* is a diagrammatic representation of laminar flow capillary channel adjusted for low pressure variations; and FIG. 3*c* is a diagrammatic representation of laminar flow capillary channel adjusted for high pressure variations.

The damping device according to the invention comprises a body 1 threaded connected to the pulsating pressure source, said body being provided internally with two shoulders *a* in the form of a cone frustum, the shoulders being also provided with the grooves *b*. The outside of the body 1 is provided with a pin *c* also in form of a cone frustum with smooth surface. Access of the working fluid to the space between the shoulders is made possible by the ports *d*. The working fluid is separated from the liquid within the pressure gauge by a cylindrical diaphragm 2 mounted on a tubular member 3 having two faces in the form of a frustum of a cone with grooves *b* permitting a tight pressure fit of diaphragm 2 on the shoulders by making up the lip union 4.

Inside the tubular member 3, concentric with diaphragm 2, a threaded pin 5 is fitted; this pin 5 is sealed on the outside by an O-ring 6 and a stuffing box packing 7 held in place by a packing gland 8. To prevent the entry of foreign matter, the protecting means 9 is mounted on the upper end and a grip 10 is provided to enable rotation of the pin.

As shown in FIGS. 2*a* and 2*b*, the threaded pin 5 has a regular cylindrical thread, truncated by external conical machining. A portion comprising the last threads of the pin is not truncated. The corresponding thread on the inside of the tubular member 3 is of the regular cylindrical type, with no clearance along the thread profile crest.

Hence the cylindrical thread of the pin has the normal sharp-V groove or root but a crest which lies along a forwardly converging conical surface while the cylindrical thread of the tubular member 3 is of the sharp-V type both at its crest and its root.

Owing to the special construction of pin 5 a capillary channel is formed along the thread-profile crest for the entire length of the engagement of the threads. The capillary channel thus created is helical in form and has a triangular cross-section. The length of the capillary channel can be changed by screwing the pin 5 into the bore, i.e. the length is proportional to the number of threads being engaged. The cross-section of the helical capillary channel shown in FIG. 3a is also changed from the inlet to the outlet as shown in FIGS. 3b and 3c, where two length, $l_1$ and $l_2$, of the capillary channel are shown. It can be seen that the inlet cross-section is constant while the outlet cross-section decreases continuously and proportionally to the number of threads of pin 5 in engagement. For the gradual reduction of the outlet cross-section to plug the capillary channel, the last threads of pin 5 should be engaged, the last portion of threads thereof being not truncated by conical machining so that there is no clearance in this portion. Other thread types can be used, for example trapezoidal threads, etc. The screwing limits of pin 5 coincide with minimum damping when pin 5 is unscrewed so as to rest against the shoulder of stuffing box 8, and the maximum damping is reached when the pin 5 is completely threaded in by engaging the threads whose crests are not truncated. In this way the pressure passage is closed. On the upper side of the tubular member 3, two threaded holes are provided, one for connection to the pressure gauge and one for the checkvalve serving to fill the liquid to be measured into the hydraulic system of the pressure gauge. A diaphragm 2 separates the hydraulic system from the working fluid.

The functions of the damping device are to:

separate the working fluid from the pressure liquid to be measured by means of the cylindrical diaphragm 2; and adjustably damp the pressure pulses of the liquid to be measured, by the streamlined flow effect achieved in the capillary channel formed by pin 5 owing to its thread crests being progressively truncated.

The damping device according to the invention can be used in conjunction with conventional pressure gauges for measuring pulsating pressures of non-Newtonian liquids or corrosive fluid; the damping device can also be installed as part of a unit comprising a fluid separator, pressure snubber, diaphragm pressure transducer and recording means.

The advantages of the device of the present invention are as follows:

it allows continuous adjustment of damping by simultaneously varying the length and cross-section of the capillary channel;

it affords a simple construction of the capillary channel, achieved by the use of regular cylindrical thread whose crest profile is progressively truncated by external conical machining of the thread pin;

it can be of reduced size because the damping device is concentric with the cylindrical diaphragm separator;

it permits the diaphragm to be sealed at both ends by use of a single easily removable sealing means of the high pressure union type;

it makes use of a diaphragm of simple construction, e.g., a hose section.

What is claimed is:

1. In an apparatus for the measurement of pressure, a pulsation damping device comprising:

housing means forming an internally threaded bore and having an inlet for a fluid whose pressure is to be measured axially spaced from an outlet for said fluid, said bore having a cylindrical thread between said inlet and said outlet; and a pin threadedly received in said bore, said pin having a threaded portion with a cylindrical thread complementarily engaging the thread of said bore with a truncated crest lying along a conical surface converging toward said inlet over at least part of the length of said threaded portion proximal to said inlet whereby the crest of the thread of said portion defines with the root of the thread of said bore a capillary channel of a length and outlet flow cross-section determined by the degree to which said portion is threaded into said bore, and an invariant inlet flow cross-section.

2. The apparatus defined in claim 1 wherein:

said housing means comprises a sleeve member formed with said bore, said pin having an actuating end projecting axially from said sleeve member and rotatable to advance and retract said threaded portion relative to said sleeve member, backing means surrounding said end of said pin and fixed to said sleeve member for preventing escape of fluid between said sleeve member and said pin, an outer tubular member coaxially receiving said sleeve member and detachably connected thereto while surrounding said sleeve member with clearance at least in the region of said inlet, said apparatus further comprising a diaphragm for separating said fluid from accompanying matter, said diaphragm coaxially surrounding said sleeve member and being clamped between said tubular member and said sleeve member.

3. The apparatus defined in claim 2 wherein said threaded portion is provided with cylindrical threads at its end proximal to said outlet sealingly interfittable with the threads of said bore to block flow of fluid through said capillary channel.

References Cited

UNITED STATES PATENTS

| 2,091,764 | 8/1937 | Martin | 138—43 |
| 3,080,758 | 3/1963 | Decker | 73—414 |

DONALD O. WOODIEL, Primary Examiner